F. D. BURRIS.
MOTOR PLOW.
APPLICATION FILED NOV. 15, 1912.
1,178,212.
Patented Apr. 4, 1916.
4 SHEETS—SHEET 4.
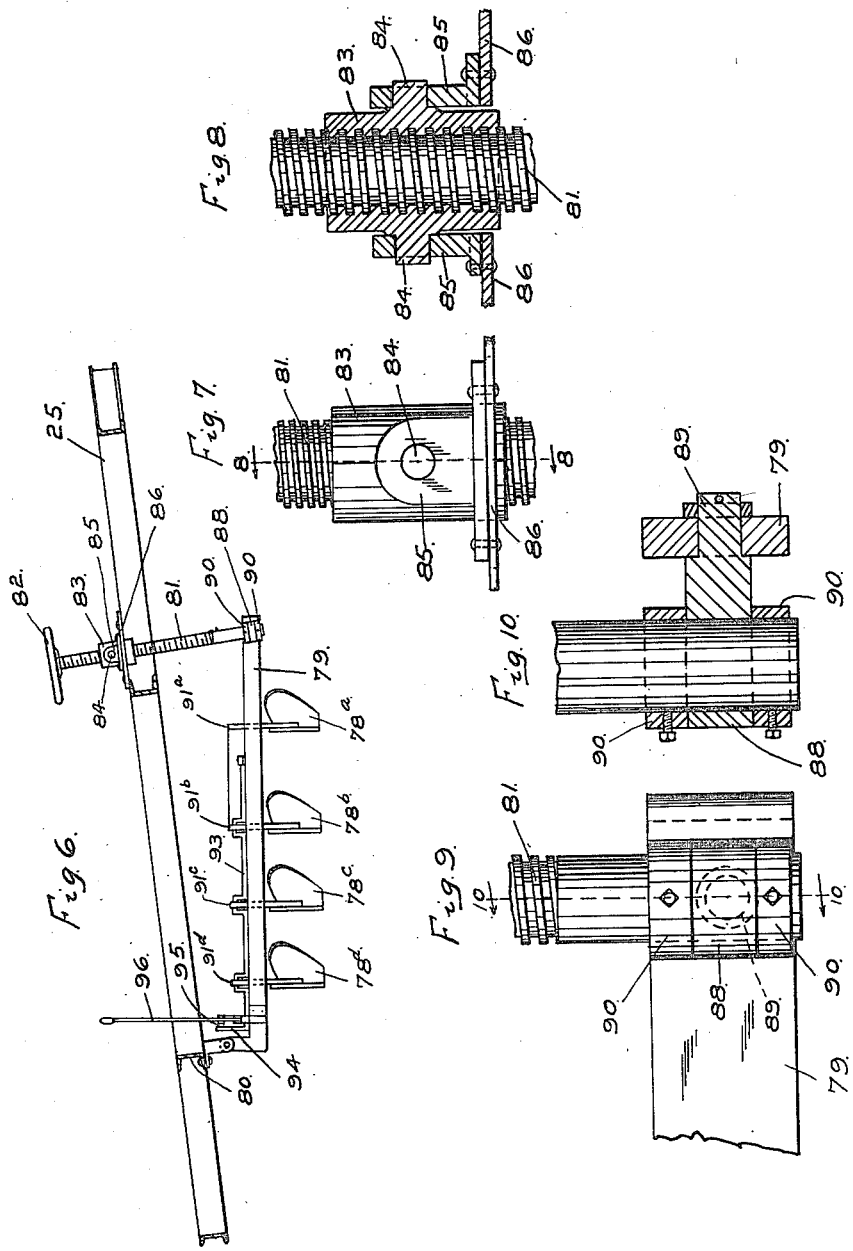

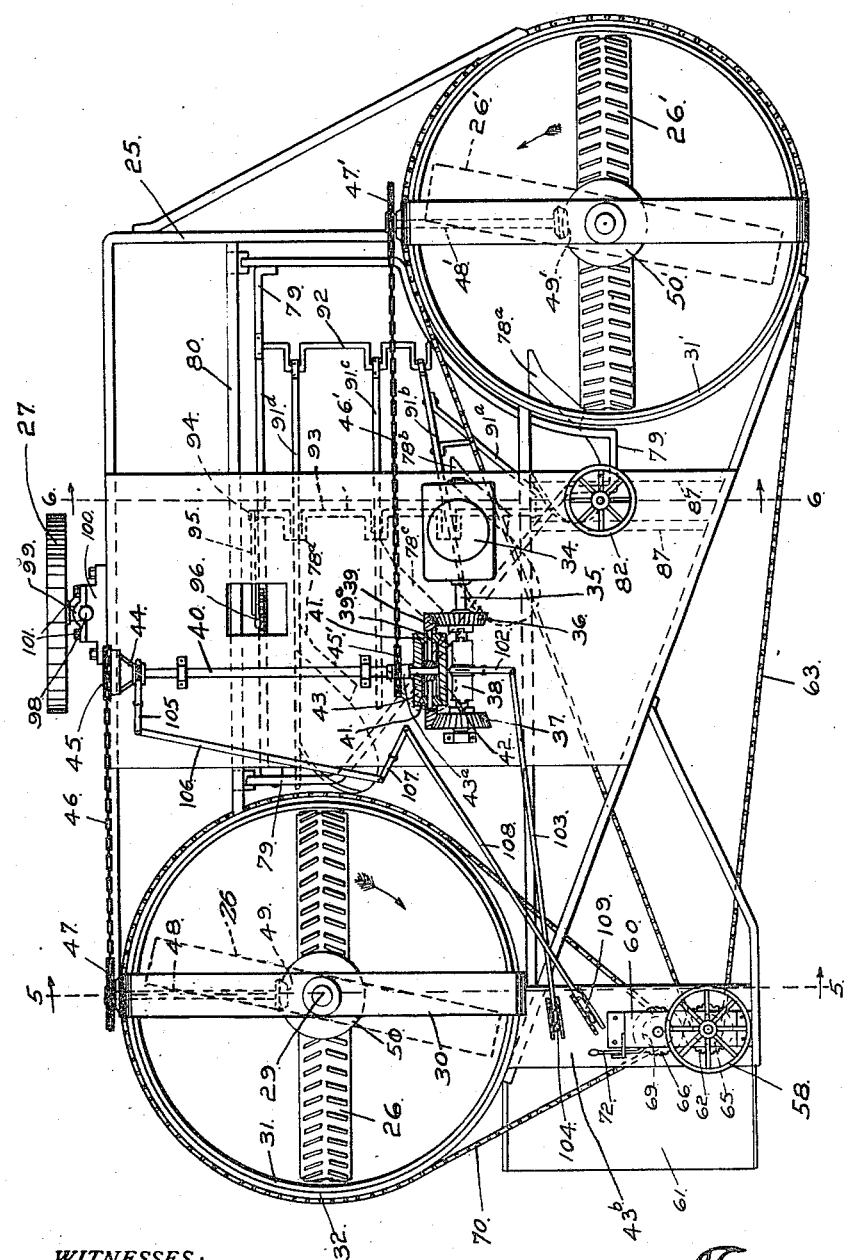

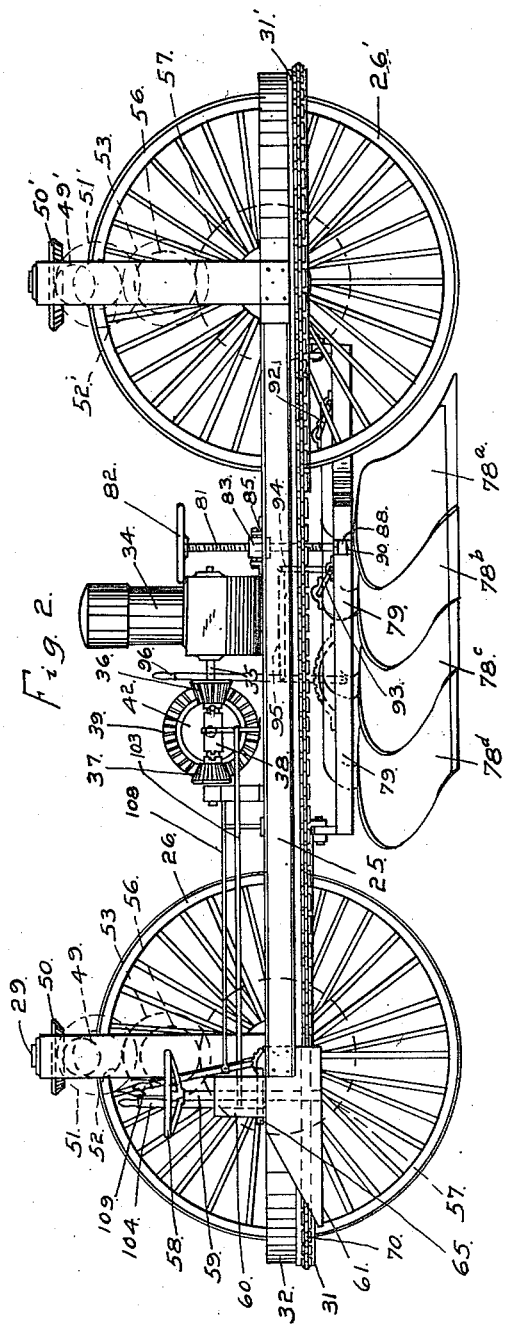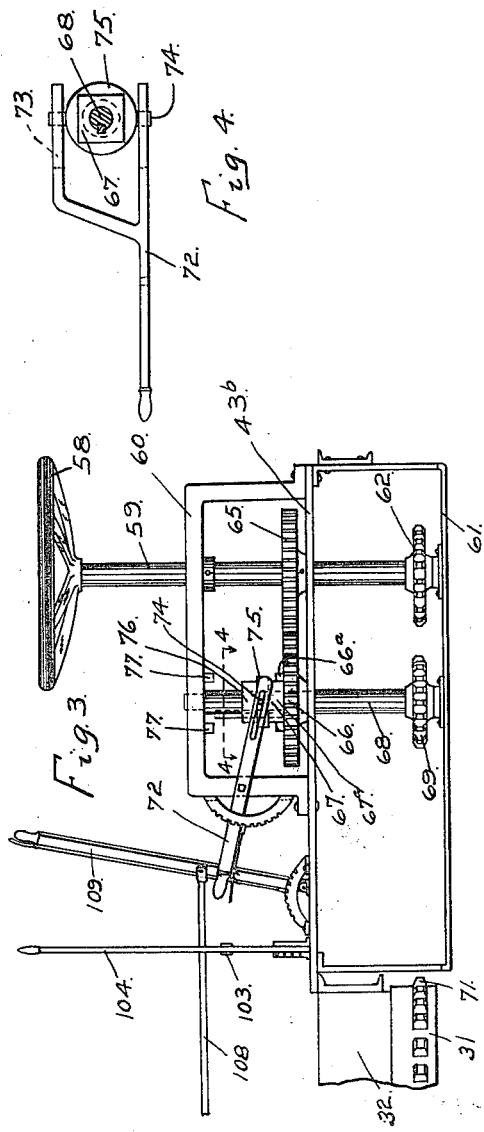

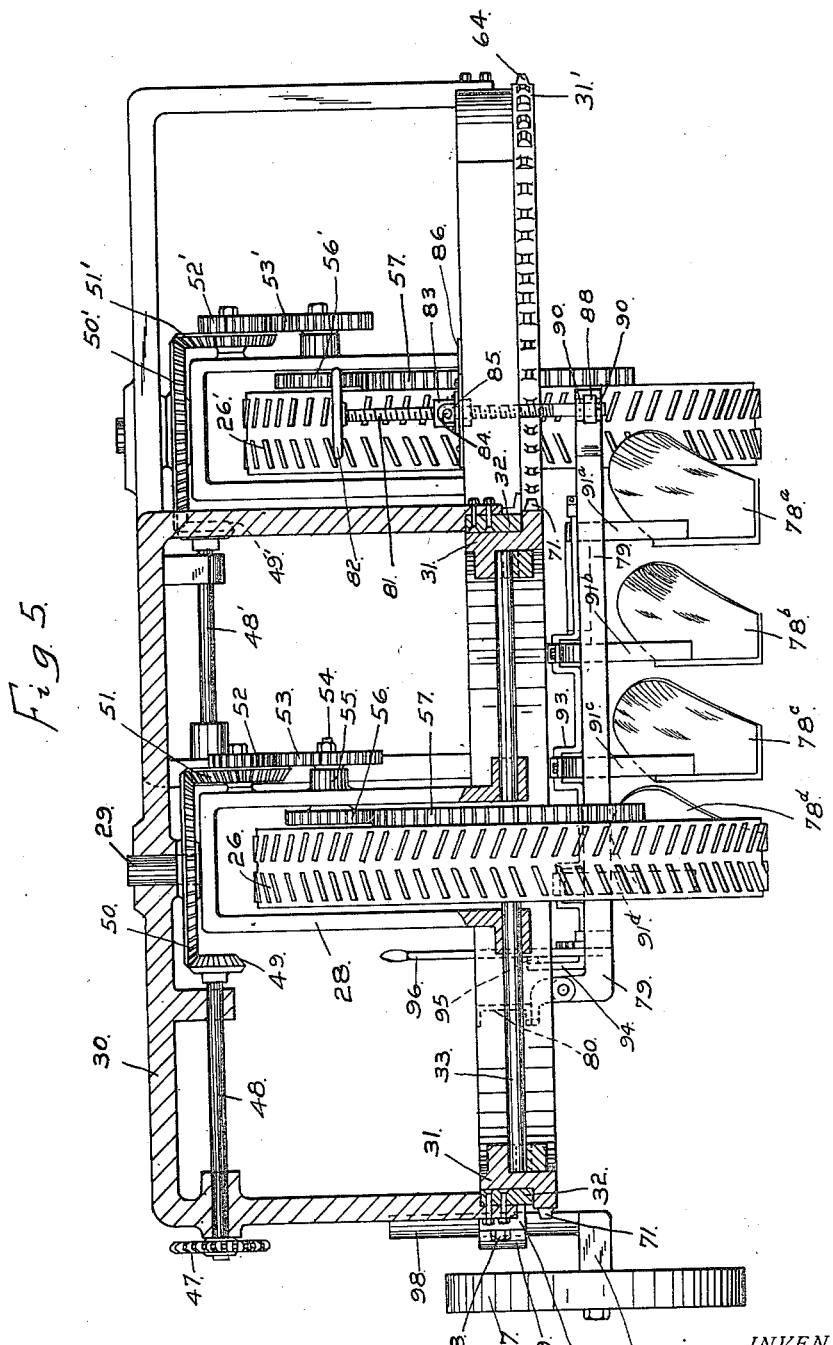

UNITED STATES PATENT OFFICE.

FRANK D. BURRIS, OF WAUKEGAN, ILLINOIS.

MOTOR-PLOW.

1,178,212.  Specification of Letters Patent.  Patented Apr. 4, 1916.

Application filed November 15, 1912.  Serial No. 731,470.

*To all whom it may concern:*

Be it known that I, FRANK D. BURRIS, a citizen of the United States, residing at Waukegan, in the county of Lake and State of Illinois, have invented certain new and useful Improvements in Motor-Plows, of which the following is a specification.

My invention relates to motor plows.

One of the objects of the invention is to provide, in a plow of this sort, an arrangement of the traction wheels and plows whereby the wheels travel in the furrows made by the plows instead of over the plowed up earth.

Another object is to provide a plow which when required can turn a relatively sharp corner.

A further object is to provide a plow which will have two traction wheels, one at the forward end of the machine and the other at the rear end, which are simultaneously driven and both of which are so mounted that they can be steered; and further, to provide an arrangement whereby one of these wheels, for example the rear wheel, may be disengaged from the steering apparatus so that the machine may be guided by means of the forward wheel alone.

The invention has for a further object to provide certain other improvements in motor plows which will be hereinafter more fully described and claimed.

The invention is illustrated, in a preferred embodiment, in the accompanying drawings, wherein—

Figure 1 is a plan view of the plow. Fig. 2 is a side elevation of the same. Fig. 3 is a fragmentary rear end elevation. Fig. 4 is a sectional plan taken on line 4—4 of Fig. 3. Fig. 5 is an enlarged sectional view taken on line 5—5 of Fig. 1. Fig. 6 is a sectional view, showing certain parts in elevation, taken on line 6—6 of Fig. 1. Fig. 7 is a detail view of the connection between the truck frame and the screw used for adjusting the angular position of the plow carrying frame shown particularly in Fig. 6. Fig. 8 is a section on line 8—8 of Fig. 7. Fig. 9 is a detail view of the connection of the raising and lowering screw with the plow frame, and Fig. 10 is a section on line 10—10 of Fig. 9.

Like characters of reference designate like parts in the several figures of the drawings.

Referring to the drawings, 25 designates a truck frame supported on a rear traction wheel 26, a forward traction wheel 26' and a land side wheel 27; these wheels being preferably out of line with each other as shown. The rear traction wheel 26 is mounted in a fork 28 provided with a king pin 29 pivoted in a yoke 30 on the frame 25. The fork 28 is also provided with a horizontally arranged ring 31 which has a bearing in a ring 32 fixed to the frame 25. The traction wheel turns upon an axle 33 which extends through the fork 28 and has its extremities secured to the ring 31.

The traction wheels are preferably driven by a motor 34 through the interposition of a differential gear which may be of any desired construction. In the drawings the motor shaft 35 carries loosely thereon the forward and reverse bevel gears 36, 37 which are adapted to be clutched to the shaft by the slidable clutch block 38. The bevel gears 36, 37 are meshed by a bevel gear 39 loose running on shaft 40 and carrying on its spokes 39$^a$ bevel pinions 41 which mesh with bevel gears 42, 43, the former fixed to shaft 40 and the latter loose thereon. At the outer end of the shaft is a sprocket wheel 45 adapted to be clutched to the shaft 40 by a slidable clutch block 44. A link belt 46 extends around the sprocket 45 and around a sprocket wheel 47 on a shaft 48 mounted in bearings in the yoke 30 and carrying at its inner end a bevel gear 49 which meshes with a bevel gear 50 on the king pin 29 of the fork 28. The bevel gear 50 meshes with a bevel gear 51 on the side of the fork 28 with which is rigidly connected a pinion 52 meshing with a pinion 53 on a short shaft 54 turning in a bearing 55 on the side of the fork, the shaft 54 carrying on its inner end a gear 56 which meshes with a gear 57 rigidly connected with the traction wheel 26. The driving train just described permits the fork 28 to be turned when the traction wheel is steered.

The forward traction wheel 26' is supported and driven in a similar manner. The bevel gear 43 has a link 43$^a$ on which is a sprocket wheel 45' connected by a link belt 46' with a sprocket wheel 47' on a shaft 48' driving a train of gears 49', 50', 51', 52', 53', 56' and 57' identical with the driving train for the rear traction wheel.

The machine is steered by means of a hand wheel 58 carried on a shaft 59 which passes through the yoke 60 and the cross piece 43ᵇ and has a bearing on a platform 61 which preferably extends back from the cross piece 43ᵇ so as to provide standing room for the person controlling the machine. Fixed to the shaft 59 is a sprocket wheel 62 over which runs a link belt 63 which extends around the lower portion of the ring 31' in which the forward traction wheel 26' is mounted, this portion of the ring being formed with sprocket teeth 64. The shaft 59 carries a gear wheel 65 with which is adapted to mesh a gear wheel 66 on a shaft 68. Feathered on shaft 68 is a block 67 the lower end 67ᵃ of which is square so as to engage lugs 66ᵃ on the gear 66. The shaft 68 carries a sprocket wheel 69. A link belt 70 extends around the sprocket 69 and engages teeth 71 formed on the ring 31 in which the rear traction wheel is mounted. The block 67 is raised by means of a forked lever 72 (Fig. 4) pivoted on the yoke 60, the forked extremities of the lever being slotted at 73 so as to engage pins 74 on a collar 75 revolubly mounted on the block. The lever is provided with the usual sector and locking dog mechanism for holding it in any desired position. The upper end 76 of the block is square and is designed to fit between lugs 77 on the under side of the yoke 60 when the block is raised. The rear traction wheel 26 will be turned when the forward traction wheel is turned but in the opposite direction. When the block is raised the gear 66 is uncoupled from shaft 68 and runs idle. If the block is raised sufficiently to bring the square portion of the block in engagement with the lugs 76, the shaft 68 and consequently the fork of the rear traction wheel are locked against turning.

The machine may be provided with any desired number of plow shares. I have shown four shares, designated 78ᵃ, 78ᵇ, 78ᶜ, 78ᵈ. These plows are arranged under the truck frame between the traction wheels 26, 26'. The rearmost plow, 78ᵈ, is directly in front of the rear traction wheel 26 so that the rear traction wheel always travels along in the furrow made by this plow. The forward plow 78ᵃ is spaced at such a distance from the land side of the forward traction wheel 26' that this wheel, after the first course around the field has been plowed, may travel in the outermost furrow made at the previous course.

During the first course around the field the forward traction wheel will necessarily travel at a higher level than the rear wheel. In order to provide for this the plows are mounted on a frame 79 hinged at one side to a longitudinal strut 80 forming a part of the truck and provided at the other side with means whereby the angular position of the frame with respect to the truck may be varied. These arrangements are shown particularly in Figs. 6 to 10 inclusive, Fig. 6 showing the truck in tilted position.

81 designates a screw provided with a hand wheel 82. The screw passes through a threaded collar 83 provided with gudgeons 84 which are supported by brackets 85 mounted on a slotted plate 86 supported on cross pieces 87 (Fig. 1) forming part of the truck frame. The lower end of the screw passes through a ring 88 formed with a stud 89 which is revolubly mounted in the plow supporting frame 79. The end of the screw 81 is secured to the ring by means of collars 90.

The plow shares are preferably secured to the frame 79 so as to allow them to be raised and lowered in order to vary the depth of the furrow. Any suitable arrangement might be employed for providing this adjustability. I have shown the plow shares 78ᵃ, 78ᵇ, 78ᶜ, 78ᵈ, provided with beams 91ᵃ, 91ᵇ, 91ᶜ and 91ᵈ, respectively. The beams 91ᵇ, 91ᶜ, 91ᵈ are connected with the cranks of a pair of crank shafts 92, 93, pivoted in the truck frame. The beam 91ᵃ is secured to the beam 91ᵇ. The crank shaft 93 is provided with an arm 94 connected by means of a link 95 to a lever 96 pivoted to the hinged frame 79 and provided with the usual sector and locking dog mechanism. It will be understood that any of the familiar devices employed for adjusting the plow shares of a plow might be used instead of the mechanism above described.

The land side wheel 27 has to be adjusted according to the depth of the furrow being cut. I have shown the wheel mounted on an axle 97 having a vertical stem 98 adapted to be clamped between the clamping blocks 99 and 100 by means of the bolts 101.

The clutch blocks 38 and 44 may be moved into and out of their engaging positions by any suitable mechanism. For the clutch block 38 I have shown a lever 102 connected by link 103 to the hand lever 104 provided with the usual toothed segment and dog mechanism. The block 44 is engaged by lever 105 connected by link 106 with lever 107 connected by link 108 to hand operated lever 109.

The intended operation of the apparatus above described is as follows: In plowing the first course around the field the hinged plow frame 79 is set oblique to the truck frame as shown in Fig. 6, the angle depending upon the depth of the furrow being cut. This in turn depends upon the vertical adjustment of the plow shares with respect to the frame which is brought about by the manipulation of the controlling lever 96. In the first course the forward traction wheel 26' necessarily runs upon unplowed land. The rear traction wheel 26 always follows the plow share 78ᵈ so that it runs in a furrow. After the first course has been plowed the forward traction wheel will travel in the innermost furrow made during the previous course. After the first course has been plowed the hinged plow supporting frame 79 is set to a position substantially parallel with the truck frame. In going down the field the machine is steered by means of the forward traction wheel 26'. The rear traction wheel is disengaged from the steering apparatus by raising the block 67 so that gear wheel 66 is uncoupled from the shaft 68 and runs idle. The block 67 is further raised until the square portion 76 engages the lugs 77 This locks the fork of the rear traction wheel so that it cannot turn. It would be difficult to properly guide the machine if both wheels had to be controlled. When the plow reaches a corner the block 67 is lowered so as to connect the rear traction wheel with the steering apparatus. The manipulation of the hand wheel 58 turns both forward and rear wheels simultaneously and equally but in opposite directions, as indicated by the feathered arrows in Fig. 1. The mounting of the traction wheels and the arrangement of the plows between them allows the machine to turn a sharp corner. After the corner has been turned the rear traction wheel may be disengaged from the steering apparatus and the course across the field continued as before.

I claim:—

1. In a motor plow, the combination with a truck, of a pair of wheels one at each end of the truck and out of line with each other, a frame pivoted to one side of said truck and provided with means whereby the other side may be raised or lowered, and a plurality of plows carried by said frame and arranged so that the said rear wheel runs directly behind one of said plows and in the furrow made thereby and so that the front wheel will travel in the furrow made by the previous course of the plow.

2. In a motor plow, the combination with a truck frame, of a pair of traction wheels one at each end of said frame and arranged out of line with each other, a third wheel adjustably secured to said frame and out of line with the said traction wheels and arranged so as to run on a higher level, a supplemental frame pivoted to one side of said truck frame and provided with means whereby the other side may be raised or lowered, and a plurality of plow shares carried by said frame and arranged so that the rear traction wheel runs directly behind one of said plows in the furrow made thereby and so that the front traction wheel will travel in the furrow made by the previous course of the plow.

3. In a motor plow, the combination with a truck provided with two traction wheels only one at each end of the truck and at opposite sides thereof mounted so as to pivot on vertical axes, of a gang of plows arranged across the truck between said wheels, the wheels and plows being so disposed that the rear wheel will run in one of the furrows being cut by said plow and the front wheel in one of the furrows cut by the plow on its previous course, means for driving both said wheels, steering mechanism for turning said wheels on their vertical axes, means for disconnecting the rear wheel from said steering mechanism so that the front wheel alone may be steered, and means for locking the rear wheel against turning on its pivotal axis.

4. In a motor plow, the combination of a truck having two traction wheels only, one at the forward end of the truck on one side thereof, and the other at the rear end of the truck on the other side. said wheels being mounted so as to pivot on vertical axes, a gang of plows on the truck between the wheels, the wheels and plows being arranged so that the rear wheel will run in one of the furrows being cut by the plow and the front wheel in a furrow cut by the plow on its previous course. means for turning said wheels on said vertical axes, and means for driving both of said wheels.

5. In a motor plow, the combination with a truck having two traction wheels only, one at the forward end of the truck on one side thereof and the other at the rear end of the truck on the other side, said wheels being mounted so as to pivot on vertical axes, a gang of plows on the truck disposed in a diagonal line between the wheels, the wheels and plows being arranged so that the rear wheel will run in one of the furrows being cut by the plow and the front wheel in a furrow cut by the plow on its previous course, means for turning said wheels on said vertical axes, and means for driving both of said wheels.

FRANK D. BURRIS.

Witnesses:
L. A. FALKENBERG,
G. Y. SKINNER.